United States Patent [19]

Nishida et al.

[11] Patent Number: 5,383,336
[45] Date of Patent: Jan. 24, 1995

[54] AUTOMATIC CONTROL ADDRESS SETTING TYPE DISTRIBUTIVELY ARRANGED AIR CONDITIONER GROUP APPARATUS

[75] Inventors: Keiji Nishida; Masayuki Kumakura; Junichi Mochida, all of Ohizumi, Japan

[73] Assignee: Sanyo Electric Co., Ltd., Moriguchi, Japan

[21] Appl. No.: 149,651

[22] Filed: Nov. 9, 1993

[30] Foreign Application Priority Data

Nov. 11, 1992 [JP] Japan ................................. 4-301161

[51] Int. Cl.⁶ ............................. F25B 7/00; F24F 3/00
[52] U.S. Cl. ........................................ 62/115; 62/175; 165/22; 236/51
[58] Field of Search .................. 62/175, 510, 115; 236/51; 165/22

[56] References Cited

U.S. PATENT DOCUMENTS

| | | | |
|---|---|---|---|
| 4,829,779 | 5/1989 | Munson et al. | 236/51 X |
| 5,265,436 | 11/1993 | Murata et al. | 165/22 X |
| 5,271,453 | 12/1993 | Yoshida et al. | 165/22 |
| 5,279,458 | 1/1994 | De Wolf | 165/22 X |

Primary Examiner—William E. Wayner
Attorney, Agent, or Firm—Armstrong, Westerman, Hattori, McLeland & Naughton

[57] ABSTRACT

A distributively arranged air conditioner group apparatus includes plural groups of air conditioners distributively arranged at remote locations wherein each group consists of a plurality of units on the heat source side and a plurality of units on the utilization side located remote from each other and a single signal line is used for a plurality of communication signal lines each usable for the purpose of controlling. To prevent a controlling operation from being erroneously performed at the time of an occurrence of signal interference, specific communication addresses are set to the respective units for the purpose of controlling communication among these units. The communication addresses are set for each group immediately after the apparatus is installed or at the time of starting of an operation of the apparatus by utilizing a plurality of heat source pipings extending between the units on the heat source side and the units on the utilization side for each group. For example, the communication addresses are set for each group by utilizing variation of the temperature of a heat source fluid adapted to flow through the units on the utilization side.

7 Claims, 9 Drawing Sheets

AUTOMATIC CONTROL ADDRESS SETTING TYPE DISTRIBUTIVELY ARRANGED AIR CONDITIONER GROUP APPARATUS

BACKGROUND OF THE INVENTION

1. Field of the Invention

The present invention relates to an apparatus including plural groups of air conditioners distributively arranged therein wherein each group consists of a plurality of units on the heat source side and a plurality of units on the utilization side located remote from each other (hereinafter referred to simply as a distributively arranged air conditioner group apparatus). More particularly, the present invention relates to an apparatus of the foregoing type which is constructed such that the apparatus includes a single common signal line for the purpose of simplifying the arrangement of control communication signal lines, and a control communication address specific to each unit is assigned to the unit in order to assure that there does not arise a malfunction that a controlling operation is erroneously performed even though control signals interfere with each other on the common signal line. Further, the present invention relates to a method of setting a plurality of addresses for an apparatus of the foregoing type.

2. Background Art

The conventional apparatuses of the foregoing type employable for setting communication addresses are typically noted in the following manner. Specifically, a first conventional apparatus of the foregoing type is constructed such that switches disposed for a unit on the heat source side and a unit disposed on the utilization side for the purpose of setting binary values or digital values are manually actuated as disclosed in an official gazette of Japanese Patent Laid-Open Publication NO. 60-165452.

A second conventional apparatus of the foregoing type is constructed such that communication address setting is achieved at the time of starting of an operation of the apparatus by executing control processing with the aid of a control processing section involved in a microcomputer, i.e., a microprocessor installed in the microprocessor. This second conventional apparatus is intended to set addresses for control communication between a unit on the heat source side and a unit on the utilization side involved in a single group. In practice, this second conventional apparatus is constructed in the following manner.

Specifically, among a plurality of units on the utilization side in a certain group, one of them is preliminarily determined as a parent unit on the utilization side so that it is distinguished from other units on the utilization side. After a signal sending address is sent from the parent unit on the utilization side so as to set a communication address for the parent unit on the utilization side, address setting request signals are sent from the other units on the utilization side. In response to the address setting request signals, a communication address for a unit on the utilization side corresponding to an unused communication address sent from the heat source side is set within a predetermined period of time. This second conventional apparatus has been disclosed as a preceding invention invented by common inventors to the present invention in official gazettes of Japanese Patent Laid-Open Publication NO. 4-283341 (corresponding to Japanese Patent Application NO. 3-45104) and Japanese Patent Laid-Open Publication NO. 4-288435 (corresponding to Japanese Patent Application NO. 3-49532).

In addition, as disclosed in an official gazette of Japanese Patent Laid-Open Publication NO. 2-108399, the third conventional apparatus of the foregoing type is constructed such that a combination of photocouplers with switching elements is employed in order to serially arrange respective signals in accordance with the signal arrival time order so as to avoid a malfunction of signal collision arising in the case that a single common signal line is used for communication signal lines for controlling a plurality of groups in the above-described manner by properly regulating the pass of the respective signals.

As described above, with the conventional distributively arranged air conditioner group apparatus wherein a plurality of groups are arranged while each single group is composed of a plurality of units on the heat source side and a plurality of units on the utilization side located remote from each other, when control communication is made therebetween by setting communication addresses with the aid of the microprocessor, there arises a necessity for laying communication signal lines for each group by a length corresponding to twice extensions thereof. This leads to the result that a required length of signal lines corresponding to twice extensions thereof is elongated more and more as the distance therebetween is increased.

In the case that a distance between the units on the utilization side is set to be short for each of all the groups, there arises an occasion that communication signal lines extending between all the units involved in all the groups is composed of a single signal line, resulting in each wiring operation being simply achieved.

However, when the last-mentioned wiring process is employed, in the case that it is necessary that a communication address between a unit on the heat source side and a unit on the utilization side is set for each group immediately after the apparatus is installed or at the time of start of an operation of the apparatus, the foregoing communication address should be set while confirming that a heat source piping is laid for which group among a plurality of groups. In addition, since a communication address setting signal is sent also to a unit involved in other group, the apparatus should be handled so as to not allow this communication address setting signal to be received by the unit in the other group.

For this reason, to satisfactorily achieve a communication address setting operation, there arises an inconvenience that many operators should be employed for performing the aforementioned operations at a rate of one operator for each unit.

SUMMARY OF THE INVENTION

The present invention has been made in consideration of the aforementioned background.

An object of the present invention is to provide an automatic address setting type distributively arranged air conditioner apparatus having a simple structure which assures that all the operations as mentioned above can be performed by a single operator.

Another object of the present invention is to provide a method of setting a plurality of address for an apparatus of the foregoing type.

According to one aspect of the present invention, there is provided an apparatus including plural groups of air conditioners distributively arranged at remote locations therein wherein a plurality of units on the heat source side and a plurality of units on the utilization side are connected to each other for each group via a plurality of heat source fluid pipings, wherein the apparatus is characterized in that a plurality of communication addresses can be set for each group by utilizing the connection of the heat source fluid pipings.

The utilization of the heat source fluid pipings in that way is theoretically achieved in the following manner, provided that address setting is associated with the utilization of the heat source pipings.

Firstly, means for utilizing a fluid flowing through the heat source fluid pipings can typically be exemplified by utilization of the flowing of the heat source fluid itself and utilization of variation of the temperature of the heat source fluid. Secondly, means for utilizing the flowing of the heat source fluid itself can typically be exemplified by utilization of electrical conductivity of each heat source fluid piping itself, utilization of sound conductivity of the heat source fluid piping, utilization of thermal conductivity of the heat source fluid piping and utilization of thermal deformation of the heat source fluid piping. Thirdly, means for utilizing physical variation of the peripheral part of the heat source fluid piping can typically be exemplified by utilization of variation of the temperature of the peripheral part of the heat source fluid piping and utilization of variation of the air flow around the heat source fluid piping.

In preferred embodiments of the present invention as will be described later, the apparatus constructed to utilize variation of the temperature of a heat source fluid is described mainly with respect to means for utilizing of the heat source fluid adapted to flow through each heat source fluid piping.

In addition, according to other aspect of the present invention, there is provided a method of setting a plurality addresses for an apparatus of the foregoing type, wherein the method is characterized in that the method includes a signal line forming procedure, a heat source fluid flowing procedure, a fluid flow detecting procedure, and an address setting procedure.

Other objects, features and advantages of the present invention will become apparent from reading of the following description which has been made in conjunction with the accompanying drawings.

DETAILED DESCRIPTION OF THE PREFERRED EMBODIMENTS

The present invention will be described in detail hereinafter with reference to the accompanying drawings which illustrate preferred embodiments thereof.

Figure 1:
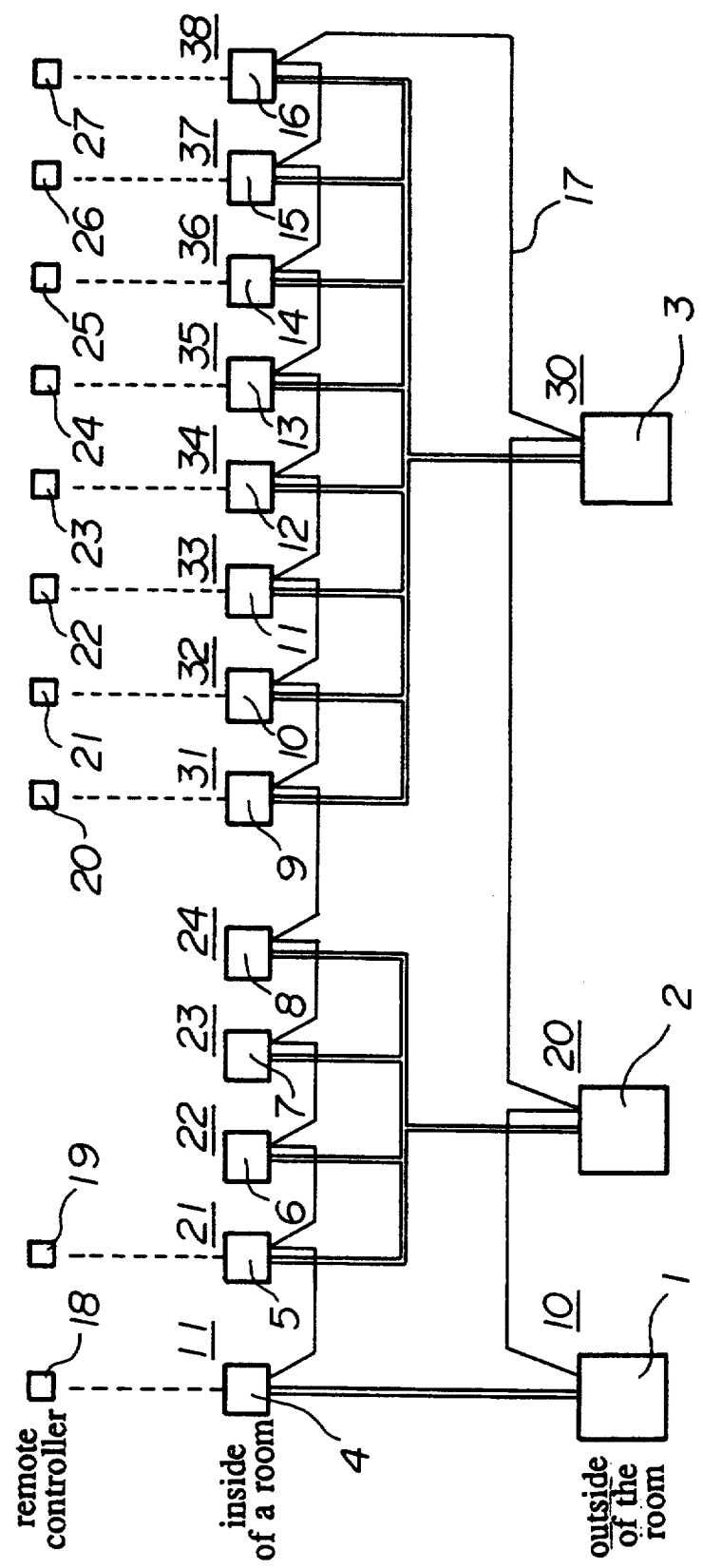
FIG. 1 is an illustrative view which schematically shows the structure of an automatic control address setting type distributively arranged air conditioner group apparatus according to an embodiment of the present invention, particularly showing a manner of setting a communication address.

In FIG. 1, a plurality of connection lines each identified by a single solid line represent signal line for controlling a series of signals, a plurality of connection lines each identified by a double solid line represent a plurality of pipings for a heat source fluid, and a plurality of connection lines each identified by a dotted line represent a plurality of connection paths each usable by wireless communication or signal line paths each shown by a signal line. The connection paths each usable by wireless communication are prepared in the form of, e.g., communication paths each usable by irradiating near-infrared rays.

The apparatus includes three groups connected to each other via a plurality of heat source fluid pipings in such a manner that a unit 4 on the utilization side is activated corresponding to a unit 1 on the heat source side, a plurality of units 5 to 8 are activated corresponding to a unit 2 on the heat source side, and a plurality of units 9 to 16 on the utilization side are activated corresponding to a unit 3 on the heat source side. The respective units are distributively arranged at predetermined positions in a building, and a single distributively arranged air conditioner group apparatus is constructed by a plurality of groups each described above. In the case that each air conditioner performs a cooling operation, since a refrigerant is used as a heat source fluid, each heat source fluid piping is constructed in the form of a refrigerant piping.

The respective units 1 to 16 are sequentially connected to each other via a single common signal line 17 to form a link communication type communication path. Since a control communication is made among all the units for all the groups via the single common signal line, the total length of all the signal lines as measured based on the whole building structure can be shortened, and moreover, each wiring operation can substantially be achieved with the apparatus of the present invention.

In addition, the apparatus includes a plurality of remote controllers 18 to 27 which serve to send desired control commands to microprocessors installed in the units 4, 5 and 9 to 16 on the utilization side so as to allow the control conditions applicable to the units 4, 5 and 9 to 16 on the utilization side and the control conditions applicable to the units 1 to 3 on the heat source side to be realized under desired conditions.

Specifically, the remote controller 18 controls an operation of the group composed of the unit 1 on the heat source side and the unit 4 on the utilization side, the remote controller 19 controls an operation of the group composed of the unit 2 on the heat source side and the units 5 to 8 on the utilization side, and the remote controller 20 to 27 control operation of a group composed of the unit 3 on the heat source side and the units 9 to 16 on the utilization sides 9 to 16. The control conditions applicable to the unit 3 on the heat source side are different from those for the units 9 to 16 on the utilization side and they are determined corresponding to the total control conditions based on the aforementioned control conditions.

In FIG. 1, codes each designated by a numeral inverted in color represent addresses to be assigned to the respective units 1 to 3 on the heat source side and the respective units 4 to 16 on the utilization side.

FIG. 1 typically shows an example wherein the apparatus includes three units on the heat source side and thirteen units on the utilization side but the whole structure of the apparatus should not be limited to this example. Alternatively, the number of units on the heat source side and the number of units on the utilization side may arbitrarily be increased and decreased. In addition, a combination of the units on the heat source side with the units on the utilization side may arbitrarily be changed.

Figure 2:
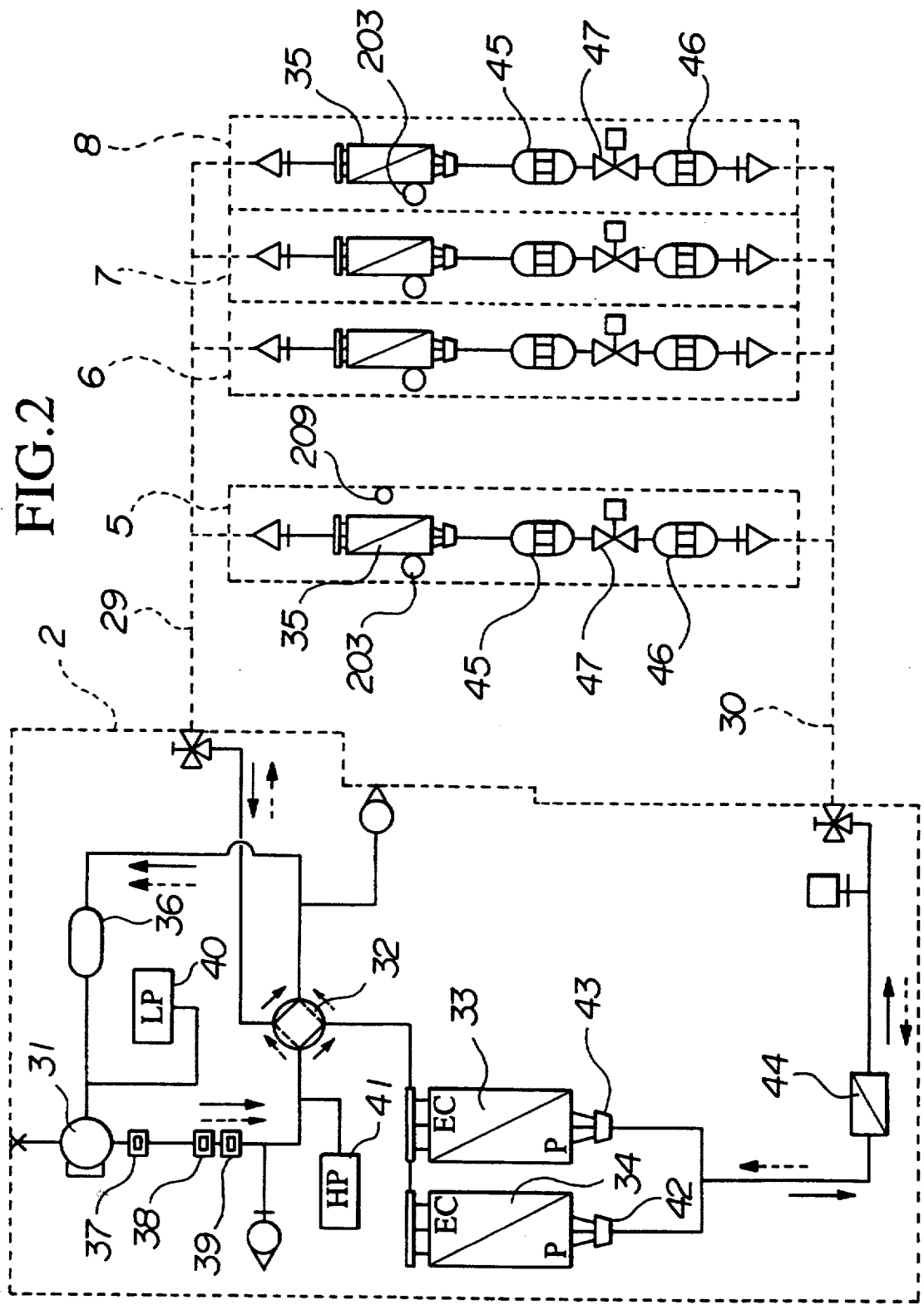
FIG. 2 is an illustrative view which shows control paths for a heat source fluid having a single group structure constituting a part of the automatic address setting type distributively arranged air conditioner group apparatus shown in FIG. 1.

In FIG. 2, pipings 29 and 30 correspond to the parts designated by the double solid lines in FIG. 1. In the case that the unit 2 on the heat source side is activated to exhibit a cooling function, the heat source fluid discharged from a compressor 31 with a high temperature and a high pressure, i.e., the refrigerant having a high temperature and a high pressure returns to the compressor 31 again via four-way valve 32, heat exchangers 33 and 34 on the heat source side, the piping 30, a heat exchanger 35 on the utilization side, the piping 29 and an accumulator 36 to thereby constitute a recirculating cycle. When the refrigerant discharged from the compressor 31 flows in the solid line arrow-marked direction, i.e., when the four-way valves 32 assumes the operative state designated by the solid lines, the heat exchangers 33 ad 34 on the heat source side are operated as condensers and the heat exchanger 35 on the utilization side is operated as an evaporator, whereby they perform a cyclic recirculating operation so as to allow the unit 5 on the utilization side to be fed with the heat source fluid to thereby perform a cooling operation with the fed heat source fluid.

In the case that the unit 2 on the heat source side is activated to exhibit a heating function, the heat source fluid discharged from the compressor 31 flows in the dotted line arrow-marked direction, i.e., the four-way valve 32 assumes the operative state designated by dotted lines. At this time, the heat exchangers 33 and 34 on the heat source side are operated as evaporators, whereby they perform a cyclic recirculating operation so as to allow the unit 5 on the heat source side to be fed with the heat source fluid to thereby perform a heating operation with the fed heat source fluid.

When a low pressure in the recirculating cycle is abnormally reduced, mufflers 37 to 39 and a low pressure switch 40 are activated to perform a protective operation for the compressor 31. On the other hand, when a high pressure in the recirculating cycle is abnormally elevated, a high pressure switch 41 is actuated to perform a protective operation for the compressor 31. Liquid separators 42 and 43 and a freeze proofing coil 44 are integrated with the heat exchangers 33 and 34 on the heat source side to serve as condensers at the time of a heating operation so as to prevent the heat exchangers 33 and 34 on the heat source side from being frozen.

The heat exchanger 35 on the utilization side, strainers 45 and 46 and an electronic type expansion valve 47 are serially connected to each other in the unit 5 on the utilization side. The electronic type expansion valve 47 serves to properly regulate a flow rate of the heat source fluid and an extent of the present pressure reduction corresponding to a magnitude of air conditioning load of a room in which air is adequately regulated, whereby it exhibits a cooling capability or a heating capability corresponding to the magnitude of air conditioning load. A regulating operation of the electronic type expansion valve 47, i.e., a controlling operation of the same is properly controlled by a microprocessor installed in the unit 5 on the utilization side in conformity with a command given to the unit 5 on the utilization side from the remote controller 19.

The units 6 and 7 on the utilization side are controlled in the same manner as the unit 5 on the utilization side. Thus, repeated description of the foregoing fact will not be required.

According to the present invention, a temperature detector 203 is disposed at the position where variation of the temperature of the heat source fluid can be detected, e.g., at the position in the proximity of the heat exchanger 35 on the utilization side for the purpose of controlling as will be described later. For example, the temperature detector 203 is constructed by using a heat-/electricity converting element including a thermistor.

Figure 3:
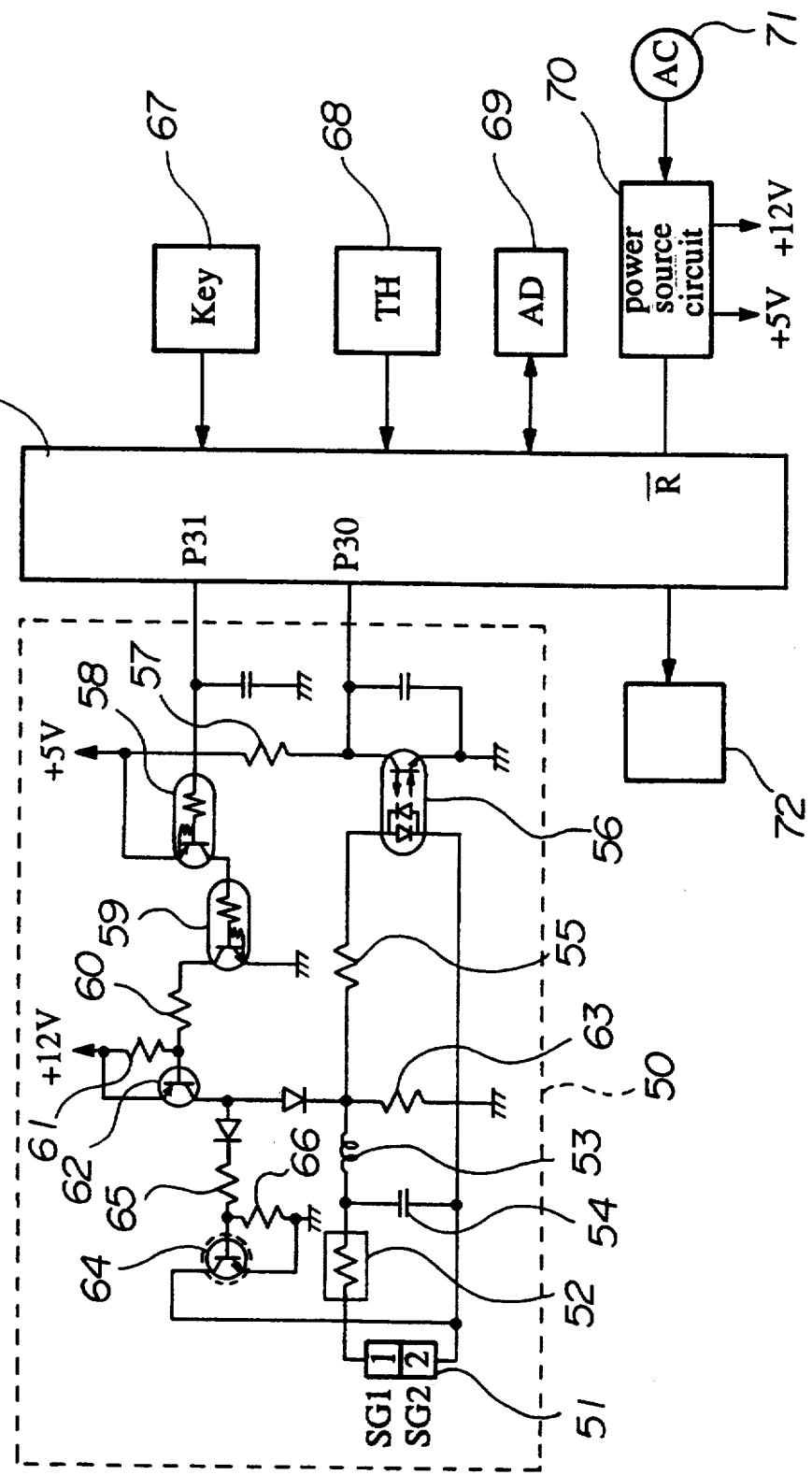
FIG. 3 is an electric circuit diagram for an essential section employed for a unit on the heat source side.

FIG. 3 is a block diagram which shows essential parts of electric circuits arranged in the unit 2 on the heat source side shown in FIG. 1 but only a part of the concrete circuit structure is shown is FIG. 3.

Referring to FIG. 3, a microprocessor 48 controls an operation of the unit 2 on the heat source side based on a program preliminarily stored therein. In addition, a timer (not shown) is involved in the microprocessor 48 to Generate a signal having a time necessary for executing control processing calculated therefor.

An I/F circuit (i.e., an interface circuit) 50 serves as an interface circuit which enables data to be sent and received between the microprocessor 48 and the signal line 17 shown in FIG. 1. A main part of the I/F circuit 50 is technically coincident with the content of the prior invention as disclosed in an official Gazette of Japanese Patent Laid-Open Publication NO. 2-108399 which has been described above in the paragraph of the prior art. Thus, an outline of operations of the I/F circuit 5 will be described below.

Signals are inputted into and outputted from the I/F circuit 50 from a connector 51, i.e., terminals SG1 and SG2 for electrically connecting the I/F circuit 50 to the signal line 17 shown in FIG. 1.

First, an input path will be described below. Specifically, an input signal inputted via the connector 51, i.e., a signal generated in response to variation of a voltage level represented by H/L is transmitted to the microprocessor 48 via a protective thermistor 52, a coil 53, a noise filter portion of a condenser 54, a protective resistor 55 and a bidirectional photocoupler 56. On receipt of the input signal, the photocoupler 56 is activated so that an output from a phototransistor involved in the photocoupler 56 first appears on an output transistor 57 and it is then transmitted to the a terminal P30 of the microprocessor 48.

Next, an output path will be described below. Specifically, a signal outputted from a terminal P31 of the microprocessor 48, i.e., a signal generated in response to variation of the voltage represented by H/L is electrically amplified in transistors 58 and 59, and thereafter, the amplified signal is transmitted to an output transistor 62 via bias resistors 60 and 61 which in turn is turned on or off. In detail, when the output transistor 62 is turned on, i.e., when the voltage level is held at a high level H, the output appearing on an output resistor 63 is outputted to the terminal SG1 of the connector 51, and at the same time, the output which has turned on a transistor 64 causes the voltage level at the terminal SG2 of the connector 51 to be lowered to an earth voltage level. In this manner, in response to variation of the voltage level H/L which assures that a voltage difference between the high level H and the low level L, e.g., 12 V can reliably be obtained, a signal can be outputted to the signal line 17 via the connector 51.

The I/F circuit 50 is constructed such that the presence or the absence of an output signal can be confirmed, a malfunction of signal collision or interference that an output signal from the relevant unit and an output from other unit simultaneously overlap each other can be confirmed, and moreover, signal inputting/outputting can be achieved again at the time of signal collision or interference. Thus, when a signal is outputted from the microprocessor 48, the same signal as that outputted from the terminal P31 is simultaneously inputted from the terminal P30. Since comparison of these signals with each other makes it possible to determine whether or not the signals are correctly outputted from the microprocessor 48, collation and confirmation of the output signal can be achieved. When these signals not coincide with each other, this means that an output signal is outputted from other unit electrically connected to the signal line 17. At this time, since the output signal from the relevant unit and the output signal from other unit overlap each other and the resultant overlapped output signal is transformed into a different signal, an occurrence of signal interference or collision can be confirmed. When the occurrence of signal interference or collision is confirmed, the microprocessor 48 executes control processing so as to allow an output signal from the relevant unit to be outputted therefrom again after a certain indefinite time elapses.

Since the I/F circuit 50 constructed in the above-described manner is arranged in operative association with the microprocessor 48, the signal from the microprocessor 48, i.e., the control signal from the unit 2 on the heat source side and the control signal from other unit can be sent or received through the common signal line 17.

A key circuit 67 is prepared in the form of a switch for handling and setting the number of the units on the utilization side electrically connected to the units on the heat source side, a test operation and data specific to the units on the heat source side. The state representing the signals generated by the key actuation is scanned by the microprocessor 48 which in turn determines the set state of the key circuit 67.

A sensor circuit 68 serves to detect an electric current flowing through the compressor 31, a temperature of the compressor 31, a temperature of the refrigerant discharged from the compressor 31, a high pressure of the refrigerant, a low pressure of the refrigerant, a temperature of each heat exchanger on the heat source side and an atmospheric temperature with the aid of sensors (not shown), a high pressure sensor and a low pressure sensor 40 shown in FIG. 2, and subsequently, input the results derived from the foregoing detections into the microprocessor 48. The microprocessor 48 performs a controlling operation based on the results derived from the detections such that a group of air conditioners are safely operated at a high efficiency.

An address setting switch 69 is prepared in the form of a switch adapted to handle not only the starting of a setting operation for addresses specific to the units on the heat source side but also the setting of specific addresses in the case that manual address setting is substituted for automatic address setting. The microprocessor 48 scans the state that the address setting switch 69 is actuated so as to determine the switch actuated state.

A supply source circuit 70 generates electricity required for an operation of the units 2 on the heat source side from the AC electricity fed from a commercial AC supply source 71. In addition, in response to a signal from the microprocessor 48, a driver circuit 72 drives the compressor 31, the four-way valve 32 and outdoor fan motors (not shown) attached to the heat exchangers 33 and 34 on the heat source side shown in FIG. 2.

Figure 4:
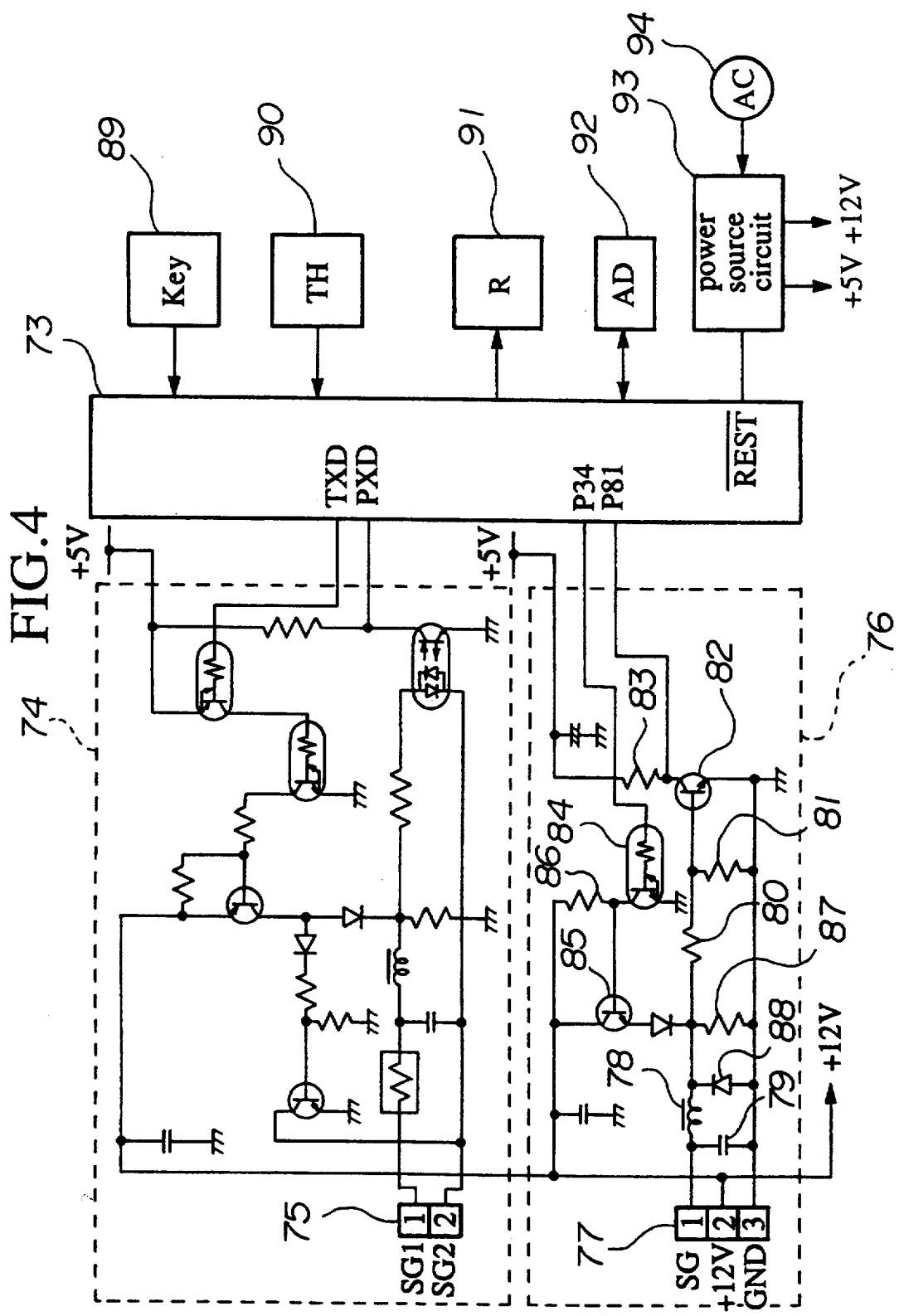
FIG. 4 is an electric circuit diagram for an essential section employed for a unit on the utilization side.

FIG. 4 is a block diagram which typically shows essential components of electric circuits arranged in the units 5 to 8 on the utilization side wherein a concrete circuit structure is shown in the drawing merely with respect to a part of the essential components.

Referring to FIG. 4, a microprocessor 73 controls an operation of the unit 5 on the utilization side based on a program preliminarily stored therein. Incidentally, a timer for obtaining a signal having a time necessary for executing control processing calculated therefor is involved in the microprocessor 48.

An I/F circuit (i.e., an interface circuit) 74 serves as an interface circuit which makes it possible to send and receive data between the microprocessor 74 and the signal line 17.

Thus, the I/F circuit is a circuit same to the interface circuit 50 described above with reference to FIG. 3. Since the interface circuit I/F 74 is electrically connected to the signal line 17 via terminals SG1 and SG2 of a connector 75, and moreover, connected to terminals TXD and PXD of the microprocessor 73 in the same manner as the interface circuit 50, signals from the microprocessor 73, i.e., a control signal from the unit 5 on the utilization side and control signals from other units are likewise sent and received via the signal line 17.

An I/F circuit 76 serves as an interface circuit which makes it possible to send and receive data between the microprocessor 73 and the remote controller 19.

Next, an input path will be described below. A signal inputted from a connector 77 having a terminal SG to be electrically connected to a signal line extending from the remote controller 19 shown in FIG. 1, a plus 12 V output terminal and a GND terminal, i.e., a signal of which voltage level varies as represented by H/L is transmitted to a switching transistor 82 not only via a coil 78 forming a noise filter in cooperation with a condenser 79 but also via bias resistors 80 and 81. In response to the input signal, the switching transistor 82 is activated such that an output appearing on an output resistor 83 of the switching transistor 82 is transmitted to a terminal P81 of the microprocessor 73.

Next, an output path will be described below. A signal outputted from a terminal 34 of the microprocessor 73, i.e., a signal of which voltage level varies as represented by H/L is electrically amplified in a transistor 84, and subsequently, a transistor 85 is turned on or off depending on an output appearing on an output resistor 86. When the transistor 85 is turned on, i.e., when the voltage level is held at the H level, an output appearing on an output resistor 87 is outputted to the terminal SG of the connector 77. Incidentally, a diode 88 serves as a protective diode which serves for reverse connection of the connector 77.

In such manner, the signal of which voltage level varies as represented by H/L can be outputted to the remote controller 19 via the connector 77.

In addition, the I/F circuit 76 is constructed such that the output signal from the relevant unit is collated and confirmed, signal interference or collision arising when the output signal from the relevant unit and the output signal from the remote controller 19 simultaneously overlap each other is confirmed, and moreover, the output is transmitted again at the time of signal interference or collision. When the output signal is outputted from the microprocessor 73, the same signal as that outputted from the terminal P81 is simultaneously inputted from a terminal P34. Since it can be determined from the comparison made between these signals whether the signals are properly outputted or not, the output signals can reliably be collated and confirmed. When the output signals do not coincide with each other, the output signal from the remote controller 19 appears on the signal line 17 and the output signal from the relevant unit and the output signal from the remote controller 19 overlap each other, causing the resultant overlapped output signals to be transformed into a different signal. Thus, this makes it possible to confirm an occurrence of signal interference or collision. When an occurrence of signal interference or collision is conformed, the microprocessor 73 executes control processing after a certain time elapses so as to assure that the output signal from the relevant unit is transmitted again.

Since the I/F circuit 76 constructed in the above-described manner is arranged in association with the microprocessor 73, the signals from the microprocessors 73, i.e., the control signal from the unit 5 on the utilization side and the control signal from the remote controller 19 can be sent and received via the common signal line 17.

In the case that the apparatus is constructed such that transmission of the control signals is limited merely to transmission of a command signal from the remote controller 19 to the microprocessor 73, the apparatus may be constructed without any arrangement of the I/F circuit 76 constructed in that way.

A key circuit 89 is prepared in the form of a switch for confirming the presence or the absence of a remote controller to be connected, conducting a test operation and handling and setting data specific to each unit on the utilization side. The microprocessor 73 scans the signal state that the key circuit 89 is actuated. Thus, the microprocessor 73 can determine the set state of the key circuit 89.

A sensor circuit 90 detects a temperature of each heat exchanger on the utilization side and a room temperature with the aid of a temperature detector 203 and a room temperature detector 209 disposed on a path on the air suction side for the unit 5 on the utilization side shown in FIG. 2, and the results derived from the temperature detections are inputted into a microprocessor 90. This microprocessor 90 performs a controlling operation based on the results derived from the temperature detections such that the respective air conditioners are safely operated at a high efficiency.

In response to signals from the microprocessor 73, a driver circuit 91 drives a fan motor (not shown) attached to the heat exchanger 35 for the unit 5 on the utilization side shown in FIG. 2, an electric heater (not shown) involved in the unit 5 on the utilization side for the purpose of auxiliary heating and the electric type expansion valve 47 so as to control the on/off state of the electric heater and an extent of opening/closing of the electronic expansion valve 47.

An address setting switch 92 serves as a switch which sets an address specific to the relevant unit, e.g., in the case that a controlling operation is performed by manual address setting but not by automatic address setting to be described later. In this case, the microprocessor 48 scans the state that the address setting switch 92 is actuated so as to enable it determine the present state that it is actuated.

A power source circuit 93 provides electricity required for operating the unit 5 on the heat source side from AC electricity fed from a commercial AC power source 94.

It should be noted that the same structure as that shown in FIG. 3 is involved in the units 1 and 3 on the heat source side shown in FIG. 1, and moreover, the same structure as that shown in FIG. 4 is involved in the units 4 and 9 to 16 on the utilization side shown in FIG. 1. However, detailed description on these structure will be neglected herein for the purpose of simplification.

Figure 5:
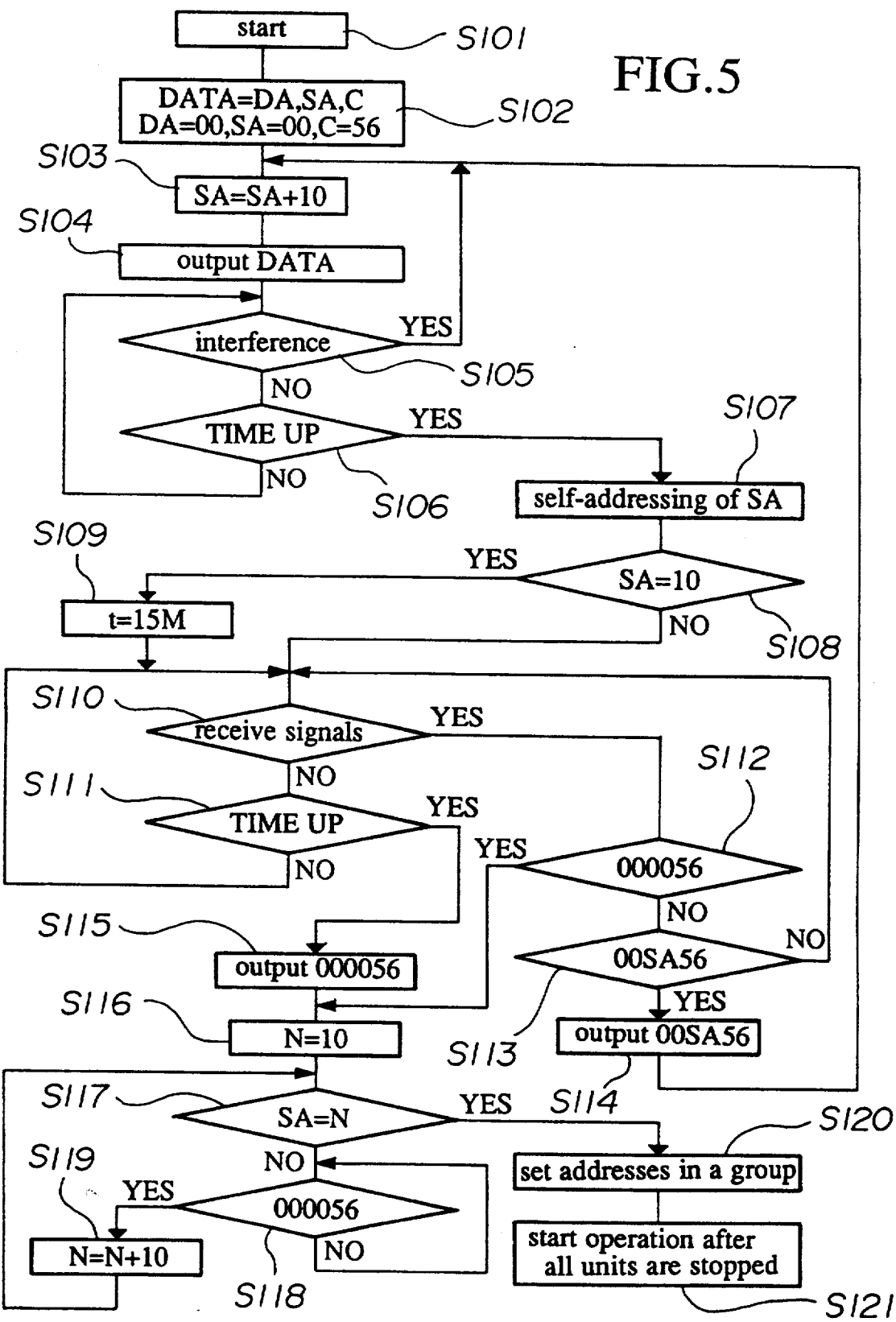
FIG. 5 is a flowchart which shows a series of main operations to be performed by a unit on the heat source side when addresses are automatically set with the apparatus of the present invention.
Figure 7:
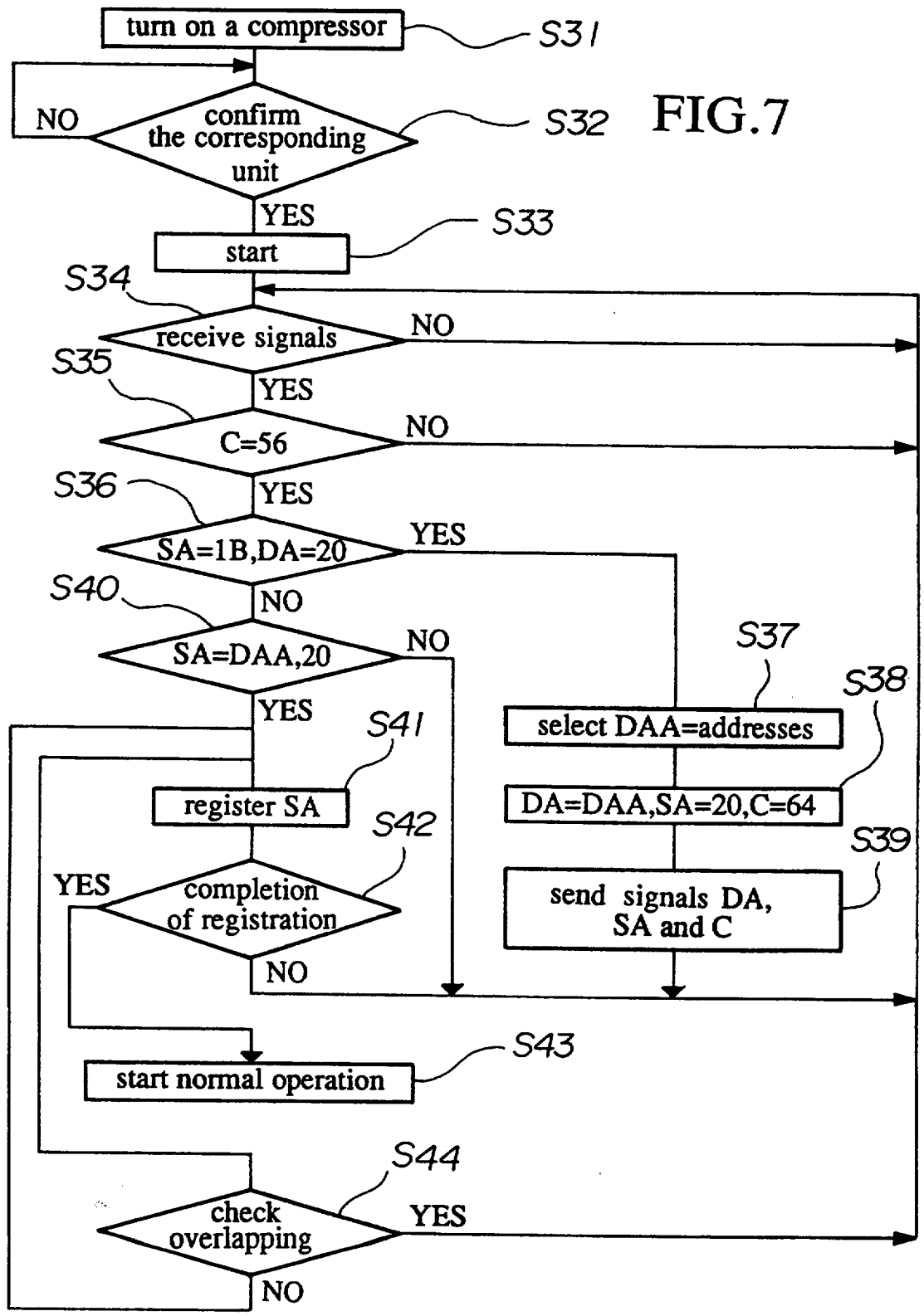
FIG. 7 is a flowchart chart which shows a series of operations to be performed by a unit on the heat source side when addresses for a unit on the utilization side are automatically set with the apparatus of the present invention.
Figure 8:
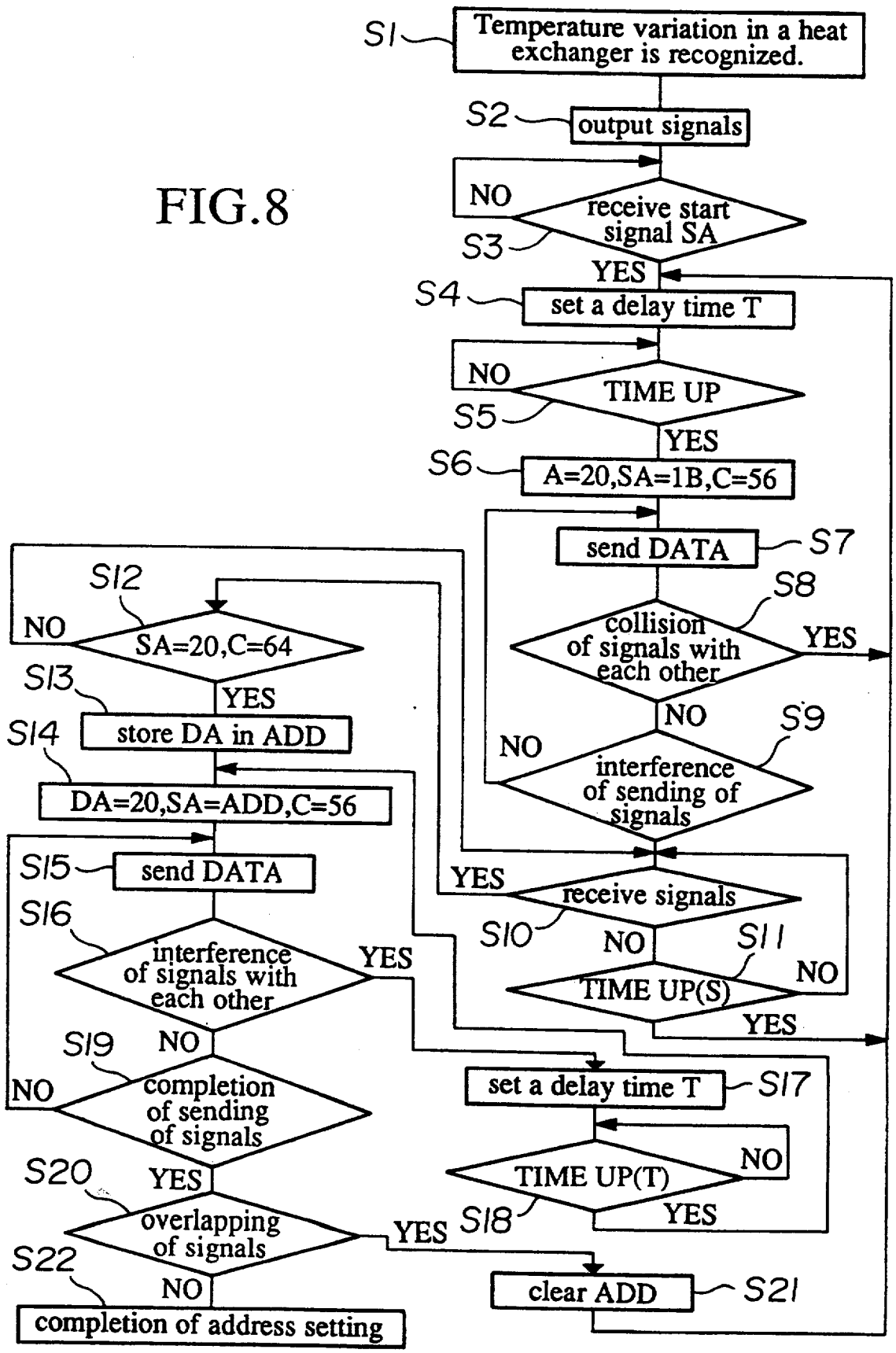
FIG. 8 is a flowchart which shows a series of operation to be performed for setting addresses for, the unit on the utilization side with the apparatus of the present invention.

With the distributively arranged air conditioner group apparatus shown in FIG. 1, when control processing is executed for automatically setting addresses, control communication addresses for controlling the state of air conditioning are set for each unit on the heat source side and each unit on the utilization side by executing a series of control processings in accordance with flowcharts shown in FIG. 5, FIG. 7 and FIG. 8 at the time of start of operation of the apparatus based on programs stored in the microprocessor 48 shown in FIG. 3 and the microprocessor 73 shown in FIG. 4, and subsequently, the thus set addresses are memorized in a memorizing section, i.e., a memory of each microprocessor, whereby subsequent control communication is made among the respective units with reference to the addresses memorized in the memories.

With this construction, it suffices that automatic address setting is executed merely at the time of start of an operation of the apparatus immediately after installation of a group of distributively arranged air conditioners is completed, in order to definitely distinguish one unit from another one among a group of distributively arranged air conditioners which are to be controllably connected to each other. However, the present invention should not be limited only to this type of automatic address setting. Alternatively, automatic address setting may be executed again at the time of starting of an operation of the apparatus that is coincident with a desired point of time.

A series of control processing operations and associated operations will be described below with reference to the flowcharts shown in the drawings.

FIG. 5 is a flowchart which shows main control processing operations to be performed by the microprocessor 48 for one of the units 1 to 3 on the heat source side, in order to automatically set addresses for making a control communication.

Next, the structure of the flowchart shown in FIG. 5 will be described below.

First, in Step S101, feeding of electricity to all the units, i.e., the units 1 to 3 on the heat source side and the units 4 to 16 on the utilization side is started. At this time, a cyclic heat source fluid recirculating operation is not started for the units 1 to 3 on the heat source side regardless of the feeding of the electricity. This Step S101 is a step of control processing to be executed in the case that a wiring operation is achieved such that electricity can be fed to all the units when each unit on the heat source side is fed with electricity and an operation of the same is started in accordance with this flowchart. In the case that any wiring operation is not achieved for the above-described manner, it is necessary that Step 102 is substituted for Step S101 so that the program starts from the next Step S102 after all power source switches are actuated for feeding electricity to all the units.

When initialization of the microprocessor installed in the operating unit on the heat source side is completed in Step S102, predetermined signals (DATA=DA, SA, C) are set for the unit. Among the signals, DA designates a destination address, SA designates a source address, and C designates a control code, and setting is achieved such that DA=00, SA=00 and C=56. Incidentally, C=56 designates a control code employable for automatic address setting.

In Step S103, addresses are selected for the units on the heat source side. In this case, since the addresses for the respective units on the heat source side are set on the decimal numeration basis in the form of 10, 20, 30—, SA=00 is assumed as an initial value, and thereafter, each subsequent address is represented in the form of a numeral representing the preceding address added with ten. Thus, an address candidate for a first unit on the heat source side is represented by SA=10, and thereafter, the program goes to next Step S104.

In Step, S104, DATA=00SA56 having SA=10 selected in that way is outputted from the microprocessor 48. At the same time, a counting time of the timer is set to ten seconds, and thereafter, the program goes to Step S105. When the microprocessor 48 determines in response to an output signal generated by outputting DATA that signal interference or collision occurs as will be described later, control processing to be executed in Step S104 is repeated after a certain indefinite time elapses. For example, a time obtained by multiplying a temperature value p detected by a temperature sensor (not shown) disposed on each unit on the heat source side by a predetermined value is taken as the foregoing indefinite time. This leads to the result that the apparatus exhibits excellent random properties with few possibility that signal interference or collision occurs again.

In Step S105, the microprocessor 48 receives DATA=00SA56 outputted from other unit on the heat source side and then make comparison with DATA=00SA56 outputted from the relevant unit on the heat source side so as to determine whether the signal having the same SA is received or not. When it is determined that the signal having the same SA as mentioned above is received, the program returns to Step S103. If not, after the microprocessor 48 waits for 10 seconds, the program goes to Step S106. Although the unit on the heat source side which has fastest executed Step S104 outputs DATA of SA=10, DATA of SA=10 later outputted from another unit on the heat source side is selected in Step S105 but DATA of SA=10 outputted from the first-mentioned unit on the heat source side is returned to Step S103. Thus, an address of SA=10 is selected for the unit on the heat source side which has last executed Step S104. Consequently, the foregoing address is definitely determined in Step S107.

In Step S106, the microprocessor 48 determines whether the time counting preset for the timer in Step S104 is completed or not. When it is determined that the time counting is completed, the program goes to Step S107 but when it is determined that the time counting is not still completed, the program returns to Step S106 in which signal receiving is repeated. At this time, it is confirmed that an address candidate SA of the relevant unit on the heat source side and an address of other unit on the heat source side do not overlap each other, provided that the program goes to Step S107.

In Step S107, the address candidate SA having no overlapping confirmed therewith is registered as a formal address, and thereafter, the program goes to a next step S108.

In Step S108, the microprocessor 48 determines whether an address of the relevant unit on the heat source side is SA=10 or not. When it is determined that SA=10 is taken by the preset unit on the heat source side, the program goes to Step S109. If not, the program goes to Step S110. Since the address fastest definitely determined in Step S107 is SA=10, Step S110 is intended to determine the point of time when the address of SA=10 is fastest definitely determined.

In Step S109, a predetermined delay time of 15 minutes is set for the timer, and thereafter, the program goes to a next Step S110. This delay time is set to be long enough to allow address setting for all the units on the heat source side to be completed.

In Step S110, it is determined whether signal data outputted from other unit on the heat source side are received or not. When it is determined that they are received, the program goes to Step S112. If not, the program goes to Step S111.

In Step S111, it is determined whether the time counting set for the timer in Step S109 is completed or not. When it is determined that the time counting is completed, the program goes to Step S115 but it is determined that the time counting is not still completed, the program returns to Step S110 in which signal receiving is repeated. In Step S115, the microprocessor 48 outputs DATA=000056, and thereafter, the program goes to a next Step S116. On completion of the outputting of DATA=000056 in Step S115, there appears a signal in Step S116 which represents that after an address of SA=10 assumed as a predetermined address unit is definitely determined, a predetermined delay time of 15 minutes elapses, and moreover, it is confirmed that after an address of each unit on the utilization side is automatically set, a predetermined address candidate SA and an address of other unit on the utilization side do not overlap each other.

In Step S112, the microprocessor 48 determines whether the received signal is DATA=000056 or not. When it is determined that it is DATA=00056, the program goes to Step S116 but when it is determined that it is not DATA=000056, the program goes to Step S113. This step is intended to know that in response to a signal outputted in Step S115, i.e, an signal of DATA=00056, an address unit other than SA=10 determined as a predetermined unit address is definitely determined and set as an address applicable to all the units on the heat source side.

In Step S113, the microprocessor 48 determines whether a code of a part of SA in DATA=00SA56 of the received signal is coincident with a code of the address SA set for the relevant unit or not. When it is determined that coincidence is established therebetween, the program goes to Step S114 but when it is determined that no coincidence is established therebetween, the program returns to Step S110. Since there arises an occasion that the address which has been confirmed without any address overlapping present therebetween in Steps 103 to 106 is set for some reason with address overlapping present therebetween, Step S111 is intended to reconfirm that no address overlapping is present therebetween. When it is reconfirmed that no address overlapping is present, the program returns to Step S110 but it is reconfirmed that address overlapping is present, the program goes to Step S114. The case that addresses are set with an occurrence of address overlapping during a waiting time after signal interference or collision occurs with the signals outputted from the respective units can be noted as a typical case that address overlapping occurs.

In step S114, after DATA=00SA56 is outputted in the presence of SA same to the address SA for the relevant unit, the program returns to Step S103 in which address setting is reassumed to cancel the overlapped address.

In Step S115, N=10 corresponding to SA=10 is set regardless of the address SA for the relevant unit, and thereafter, the program goes to a nest Step S116. Subsequently, an order waiting operation for setting addresses for units on the utilization side is performed in Step S117 to S119. The reason why setting of N=10 is started consists in that since an address for each unit on the heat source side is determined on the decimal numeration basis as mentioned above, automatic address setting for each unit on the utilization side is executed from a group of units on the heat source side each having SA=10 set therefor corresponding to the case that the code of address SA has a smallest numeral.

When it is found in Step S17 that a value of N is coincident with a self address (SA) for the relevant unit, the program goes to Step S120 in which an address for each unit on the utilization side belonging to a group of units having a common heat source fluid piping is set. In addition, in Step S120, data having address coincidence are removed from the received signal (DATA). When it is found in Step S117 that no data coincidence is present, the program goes to Step S118 in which an order waiting operation is performed.

Step S118 is a step of performing an order waiting operation. When other unit on the heat source side completes address setting for a certain unit on the utilization side, the microprocessor 48 outputs DATA=000056 as a signal for permitting a subsequent unit on the heat source side to set an address on the utilization side. Subsequently, the microprocessor 48 determines whether DATA=000056 is received or not. When it is determined that it is received, the program goes to Step S119 but when it is determined that it is not received, an operation to be performed in Step S118 is repeated until it is received.

In Step S119, a value of N+10 is substituted for a value of N, and thereafter, the program returns to Step S117.

In Step S120, control processing is executed for address setting for each unit on the utilization side as will be described later. When address setting is completed for a unit in the relevant group, the microprocessor 48 outputs DATA=0010C as a signal for inquiring whether address setting for other group is completed or not. A code part in this DATA represented by a numeral of 10 corresponds to S=10 which has been set for the relevant unit. When any answer corresponding to other unit on the heat source side is not obtained within a predetermining period of waiting time after completion of the outputting of DATA=0010C, the microprocessor 48 outputs a signal representing that address setting for the whole group, i.e., all the units is completed, whereby in response to the foregoing signal outputted from the microprocessor 48, control processing is executed so as to assure that a normal air conditioning operation is started with the apparatus in Step S121.

Thus, address setting has been achieved for each group corresponding to each unit on the heat source side in the above-described manner. Here, the case of a group of distributively arranged air conditioners including three units 1 to 3 on the heat source side as shown in FIG. 1 is illustrated in accordance with the signal arrival time order shown in FIG. 6.

Figure 6:
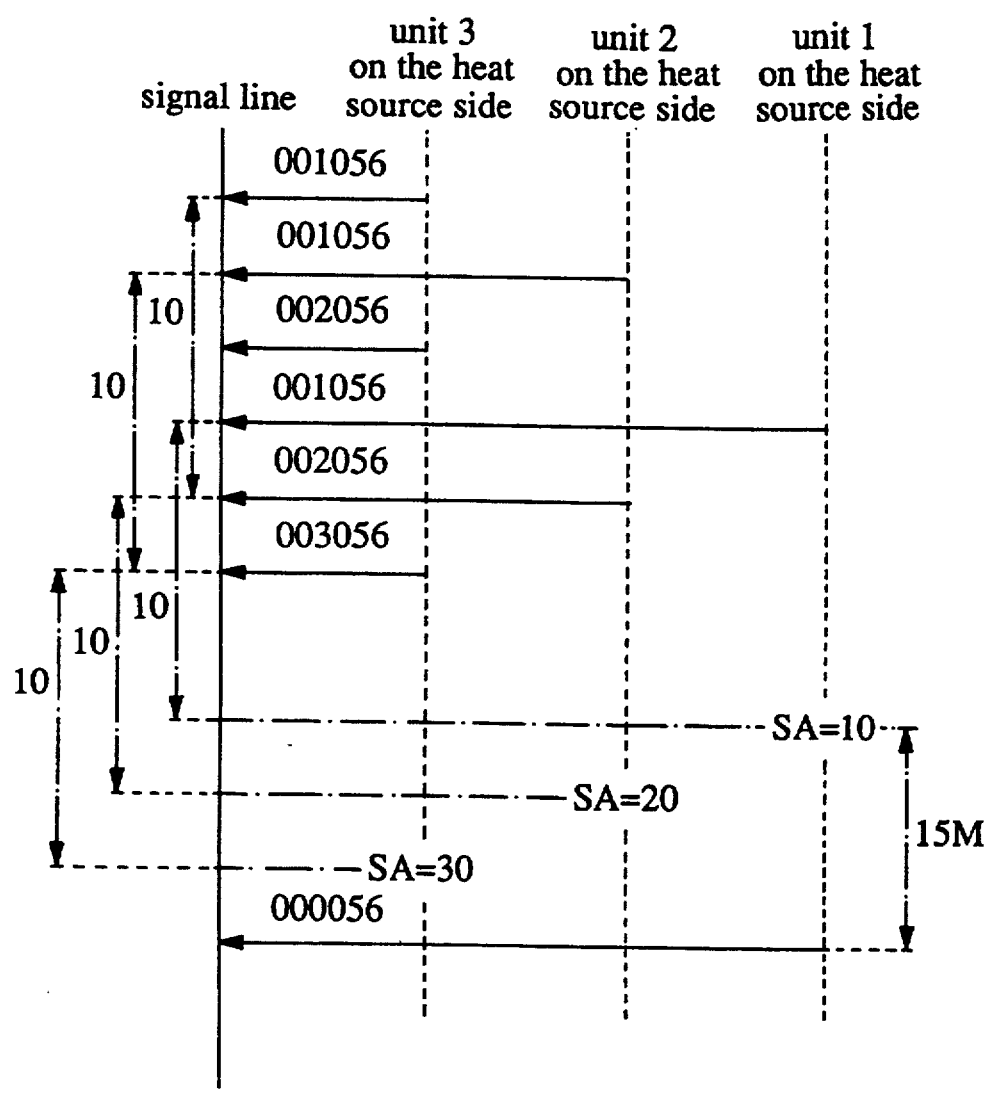
FIG. 6 is an operation diagram which shows a procedure for setting addresses for a unit on the heat source side.

Referring to FIG. 6, the automatic address setting order, i.e., the order of processings to be executed in Steps S103 to S107 shown in FIG. 5 is coincident with the order of the unit 3 on the heat source side, the unit 2 on the heat source side and the unit 1 on the heat source side.

Concretely, when DATA=001056 is outputted from the unit 3 on the heat source side, DATA=001056 is outputted from the unit 2 on the heat source side within a period of 10 seconds, and subsequently, in response to the outputting of DATA=001056 from the unit 2 on the heat source side, DATA=002056 is outputted from the unit 3 on the heat source side.

Similarly, since the unit 1 on the heat source side outputs DATA=001056 within a period of 10 seconds, in response to the outputting of DATA=001056 from the unit 1 on the heat source side, the unit 2 on the heat source side outputs DATA=002056. When this signal is received by the unit 3 on the heat source side within a period of 10 seconds, the unit 3 on the heat source side outputs a signal of DATA=003056.

Since address overlapping is absent at this time, predetermined codes are set to addresses for the respective units on the heat source side. In other words, an address of the unit 1 on the heat source side is definitely set to SA=10, an address of the unit 2 on the heat source side is definitely set to SA=20, and an address of the unit 3 on the heat source side is definitely set to SA=30.

The unit 1 on the heat source side outputs a signal of DATA=000056 after 15 minutes elapses since memorization of SA=10, i.e., since completion of the address setting, and subsequently, address setting for each unit on the utilization side is started.

Controlling processing to be executed in Step S120 shown in FIG. 5, i.e., automatic address setting for each unit on the utilization side is achieved in such a manner that the microprocessor 48 arranged for the units on the heat source side executes control processing with reference to the flowchart shown in FIG. 7.

At this time, a value representing the number of units on the utilization side constructed in the form of a group including a plurality of heat source fluid pipings, e.g., the pipings 29 and 30 in this case is preliminarily inputted into the microprocessor 48 with the aid of the key circuit 67. At the stage that the program shifts from Step S117 to Step S120 shown in FIG. 5, codes for converting addresses applicable to the respective units on the utilization side into addresses having no address overlapping, e.g., codes such as SA=21, SA=22, SA=23, SA=24 or the like are stored and memorized in the memory of the microprocessor 48 based on data representing the number of units having addresses set thereto and the definitely determined addresses for the respective units on the heat source side.

Next, the flowchart shown in FIG. 7 will be described below. It should be noted that the following description is made with respect of the case that addresses are automatically set for each unit on the utilization side associated with the group corresponding to the unit 2 on the heat source side, and moreover, an address for the unit 1 on the heat source side is set to SA=20.

In Step S31, a compressor on the heat source side, i.e., the compressor 31 in the shown case is held in the operative state, and thereafter, the program goes to a next Step S32. In this Step S32, the heat source fluid is recirculated through the pipings 29 and 30 for the heat source fluid, whereby the heat source fluid is recirculated through the units 5 to 8 communicated with the unit 2 on the heat source side. Thus, variation of the temperature in the heat exchanger 35 on the utilization side caused by the recirculation of the heat source fluid is detected by the temperature detector 203 shown in FIG. 2.

According to the present invention, addresses can automatically be set by detecting the connected state of the pipings 29 and 30 for the heat source fluid, and moreover, discriminating the units on the utilization side corresponding to the units on the heat source side for each group. In the shown embodiment, units to be controlled in association with the foregoing group are discriminated by detecting the temperature variation on each unit on the utilization side caused by the heat source fluid recirculating through the pipings 29 and 30 for the heat source fluid. Incidentally, in the early part of starting of the recirculating operation of the heat source fluid through the pipings 29 and 30, to induce temperature variation in Step S1 on the flowchart shown in FIG. 8, the heat source fluid is forcibly recirculated through the pipings 29 and 30 for the heat source fluid at a highest temperature or at a lowest temperature for a short time, e.g., about five minutes enough to induce variation of the temperature in the temperature sensor 203 for each unit on the utilization side.

In Step S32, in response to a correlative signal sent from each unit on the utilization side with variation of a value representing the temperature detection of the temperature detector 203, i.e., in response to a correlative signal sent in Step S2 on the flowchart shown in FIG. 8, the microprocessor 48 compares the numeral obtained by counting the number of the received correlative signals with a numeral representing the numbers of units on the utilization side to be controlled and then determines whether or not a correlative signal is sent from all the units on the utilization side. When it is determined that the correlative signal is sent from all the units on the utilization side to be controlled, the program goes to a next Step S33 but if not, determination to be made by the microprocessor 48 is repeated until the correlative signal is sent from the all the units on the utilization side.

In Step S33, the microprocessor 48 outputs a code signal representing automatic address setting to be started and a start signal containing an address for the relevant unit on the heat source side, i.e, a start signal containing SA=20. In response to the start signal, only the units on the utilization side involved in the group, i.e., the units 5 to 8 on the utilization side each having a value representing the temperature detected by the temperature detector 203 are selected as they are operated in accordance with the flowchart shown in FIG. 8.

In Step S34, the microprocessor 48 determines whether or not each unit on the utilization side receives a start signal and then receives an answer signal in response to the start signal. When it is found that one of the units on the utilization side receives an answer signal, the program immediately goes to a next Step S35, but if not, determination to be made by the microprocessor 48 is repeated.

In Step S35, the microprocessor 48 determines whether a part of a command (C) in the received signal assumes (56) or not. In other words, the microprocessor 48 determines whether or not the received signal is an answer signal including a code presenting the address setting. When it is determined that the received signal is an answer signal of C=56, the program goes to a next Step S36 but if not, the program returns to Step S34.

In Step S36, the microprocessor 48 determines whether or not the received answer signal satisfies conditions of SA=1B and DA=20. When it is determined that it satisfies them, the program goes to a next Step S37 but if not, the program goes to Step S40.

In Step S37, a first address is selected as ADD from unselected addresses among a plurality of addresses applicable to the respective units on the utilization side preliminarily memorized in the memory of the microprocessor 48. In other words, SA=21 applicable to the first unit on the utilization side is selected as DA=ADD, and thereafter, the program goes to a next Step S38. Thus, selection of ADD relative to DA is made such that SA=22 is selected for a subsequent unit on the utilization side, and thereafter, SA=23 is selected for a unit subsequent to the preceding one on the utilization side. It should be added that this selection is repeatedly made by actuating the key circuit 67 until the number of units on the utilization side reaches a preset numeral.

In Step S38, DATA to be sent are prepared to represent conditions of DA=ADD, SA=20 and C=64, and thereafter, the program goes to a next Step S39. The condition of C=64 represents a command for allowing a certain unit on the heat source side to nominate an address to one of the units on the utilization side. In Step S39, a signal of DATA prepared in Step 38 is sent to the microprocessor 48, and thereafter, the program returns to Step S34.

In Step S40, the microprocessor 48 determines whether or not the signal received in Step S34 is an answer signal responsively sent from the unit on the utilization side which has received the signal sent in Step S39. This determination is intended so as to allow the microprocessor 48 to determine whether or not conditions of SA=ADD and DA=20 are satisfied in response to the answer signal. In other words, the microprocessor 48 determines whether or not a destination address of the signal sent in Step S39 is coincident with a source address of the signal received in Step S39. When it is determined that the conditions are satisfied, the program goes to Step S41 but when it is determined that they are not satisfied, the program returns to Step S34.

In Step S41, the sent source address of SA=ADD is registered in the memorizing section of the microprocessor 48 as an address which has been set and registered as an address (SA) for one of the units on the utilization side. In this case, as shown in FIG. 1, the sent source address is memorized in the memory of the unit 2 on the heat source side on the assumption that SA=21 is set as an address of the unit 5 on the utilization side.

In Step 42, the microprocessor 48 determines whether or not completion of the automatic address setting for all the units on the utilization side involved in the group is registered in the memorizing section of the microprocessor 48. When it is determined that the automatic address setting is completed, the program goes to Step S43 but if not, the program returns to Step S34. This determination is made in such a manner that the microprocessor 48 compares the number of times of registrations executed in the memorizing section thereof in Step S41 with a value representing the number of units on the utilization side and already memorized in the memorizing section of the microprocessor 48 and then determines whether or not coincidence is established therebetween on the assumption that the number of the foregoing times of registrations is taken as a value representing the number units which have completed the automatic address setting.

In Step S43, the microprocessor 48 outputs a completion signal representing that the automatic address setting is completed for all the units on the utilization side involved in each group, and thereafter, the program goes to a step for controlling processing for performing a normal air conditioning operation. Thus, description on all the control processings to be executed by the microprocessor 48 for each unit on the heat source side have been completed.

Next, control processings to be executed by the microprocessor 73 for each unit on the utilization side will be described below. These controlling processing are executed by a memorizing section of the microprocessor 73. In other words, they are executed in accordance with the flowchart shown in FIG. 8 based on the program memorized in a memorizing section of the microprocessor 73.

A series of control processings to be executed in accordance with the flowchart shown in FIG. 8 will be described below.

In Step S1, when the microprocessor 73 determines that the value representing the temperature detected by the temperature detector 203 and taken in the memorizing section thereof varies, the program goes to a next Step S2. This determination is made based on the fact that the value representing the temperature detected by the temperature detector 203 is taken in the memorizing section of the microprocessor 73 at a predetermined time interval, i.e., every one minute and that a subsequent detected temperature value varies in excess of a predetermined value, e.g., 1° C. or more relative to a preceding detected temperature value. Specifically, the microprocessor 73 executes control processing in Step S31 on the flowchart shown in FIG. 7 and then determines that some temperature variation arises in each unit on the utilization side attributable to a recirculation cycle of the heat source fluid adapted to recirculate through a piping belonging to a certain group among a plurality of heat source fluid pipings represented by double solid lines in FIG. 1. Here, it is assumed that the heat source fluid is recirculated through the pipings 29 and 30 involved in a group belonging to the unit 2 on the heat source side, i.e., a group constructed as shown in FIG. 2.

In Step S2, the microprocessor 73 outputs a correlative signal which represents that temperature variation arises in the relevant unit on the utilization side attributable to recirculation of the heat source fluid, and thereafter, the program goes to a next Step S3.

In Step S3, the microprocessor 73 determines whether or not a start signal is received by any unit on the heat source side in association with Step S33 in FIG. 7. When it is determined that the start signal is received, the program goes to a next Step S4 but when it is determined that it is not received, determination is repeated until it is received. The start signal to be received includes an address set for a unit on the heat source side belonging to the relevant unit on the utilization side. In the shown case, it includes an address SA=20 set for the unit 2 on the heat source side.

In Step S4, a delay time T is set to the timer, and thereafter, the program goes to a next Step S5. This delay time T represents a time value determined based on the value derived from A/D conversion of the detected temperature value of the temperature sensor 203 achieved when the microprocessor 73 determined that the temperature variation occurs in Step S1. For example, when the delay time T is set to a time value derived from addition of a time value of the detected temperature value represented by seconds to a basic time, e.g., 10 seconds, the delay time T is determined while utilizing the fact that temperature conduction varies depending on a manner of recirculation of the heat source fluid. Thus, since the delay time T is set to be different for each unit on the utilization side, control processing to be executed after a next Step S6 is conducted from a unit having a shorter delay time. In other words, the delay time T is utilized as means for determining the order of automatic address setting to be executed for each of a plurality of units on the utilization side.

In Step S5, the microprocessor 73 determines whether the delay time T elapses or not. This determination is made in response to a signal representing that time counting of the timer is completed.

In Step S6, a correlative signal including a signal component representing that address setting is started and a signal component representing that address assignment is requested, and thereafter, the program goes to a next Step S7. Here, a correlative signal to be set represents a signal corresponding to the determinations to be made in Steps 35 and 36. In this case, with DATA of the foregoing signal, the microprocessor 73 outputs a signal which is prepared such that a code of destination address DA is transformed into DA=20 from the address SA=20 sent from the corresponding unit on the heat source side, and moreover, a code of source address SA is transformed into SA=1B representing that any address is not still determined. In other words, the microprocessor 73 outputs a signal of DATA=201B56.

In Step S7, the microprocessor 73 outputs the signal set in Step S6, and thereafter, the program goes to a next Step S8. Since the signal line 17 is common to all the units, it is anticipated that on completion of the signal outputting, there arises a malfunction of signal interference or collision with another signal.

In Step S8, the microprocessor 73 determines whether signal interference or collision occurs or not. When it is determined that signal interference or collision occurs, the program returns to Step S4 but if not, the program goes to a next Step S9. This determination on the occurrence of signal interference or collision is made by comparing the outputted signal with the signal set in Step S6 as described above in the paragraphs explaining the operation of the I/F circuit 74 shown in FIG. 4, i.e., the operation of the I/F circuit 50 shown in FIG. 3.

In Step S9, the microprocessor 73 determines whether the signal sending is completed or not. This determination is made on the assumption that all of DATA on the outputted signal is coincident with all of DATA in the signal set in Step S6 as a result derived from the comparison between the outputted signal and the signal set in Step S6. When it is determined that the signal sending is completed, a time S, e.g., 10 seconds is set for the timer, and thereafter, the program goes to a next Step S10 but if not, the program returns to Step S7.

In Step 10, the microprocessor 73 determines whether or not any signal is received from other unit. When it is determined that it is received, the program goes to Step S12 but if not, the program goes to Step S11.

In Step S11, the microprocessor 73 determines whether or not the above-set time elapses or not. When it is determined that it elapses, the program returns to Step S4 but if not, the program returns to Step S10. This determination is made depending on whether or not a signal representing the completion of the counting of the time S is outputted from the timer.

In Step S12, the microprocessor 73 determines whether or not DATA of the received signal satisfies conditions of $SA=20$ and $C=60$. When it is determined that the conditions are satisfied, the program goes to a next Step S13 but if not, the program returns to Step S10. This determination is intended to confirm that the signal sent in Step S39 shown in FIG. 7 is received.

In Step S13, a code of DA present in a signal of DATA, e.g., a code of 21 in the case of $DA=21$ is memorized as a temporary address for the relevant unit on the utilization side in the memorizing section of the microprocessor 73, i.e., the memory of the same, and thereafter, the program goes to a next Step S14.

In Step S14, a code of DA stored in Step S13, i.e., a code of 21 in the same case as that in the preceding paragraph is taken as ADD, and DATA is then set corresponding to conditions of $DA=20$, $SA=ADD$ and $C=56$. Subsequently, the program goes to a next Step S15.

In Steps S15 to S18, control processings are executed in accordance with the same order as that shown in the flowchart including Steps S7, S8, S4 and S5. In addition, in Step S19, the same control processing as that in Step S9 is executed. When it is determined that the signal sending is completed in. Step S19, the program goes to Step S20.

In Step S20, the microprocessor 73 receives and monitors the communication made by other unit different from the relevant unit on the utilization side and then determines whether or not communication is made with SA same to a temporary address candidate for the relevant unit on the utilization side, i.e., SA same to a temporary address for the relevant unit on the utilization side. When it is determined that address overlapping is present, the program goes to Step S21 but if not, the program goes to Step S22.

In Step S21, the microprocessor 73 erases the temporary address in the relevant unit on the utilization side memorized in Step S13, and thereafter, the program returns to Step S14.

In Step S22, the temporary address for the relevant unit on the utilization side memorized in Step S13, i.e., in this case, a code of $SA=21$ is stored and memorized as a normal address in the memory of the microprocessor 73, whereby the automatic address setting is completed. Thus, in this case, the address for the unit 5 on the utilization side is set as $AD=21$.

Figure 9:
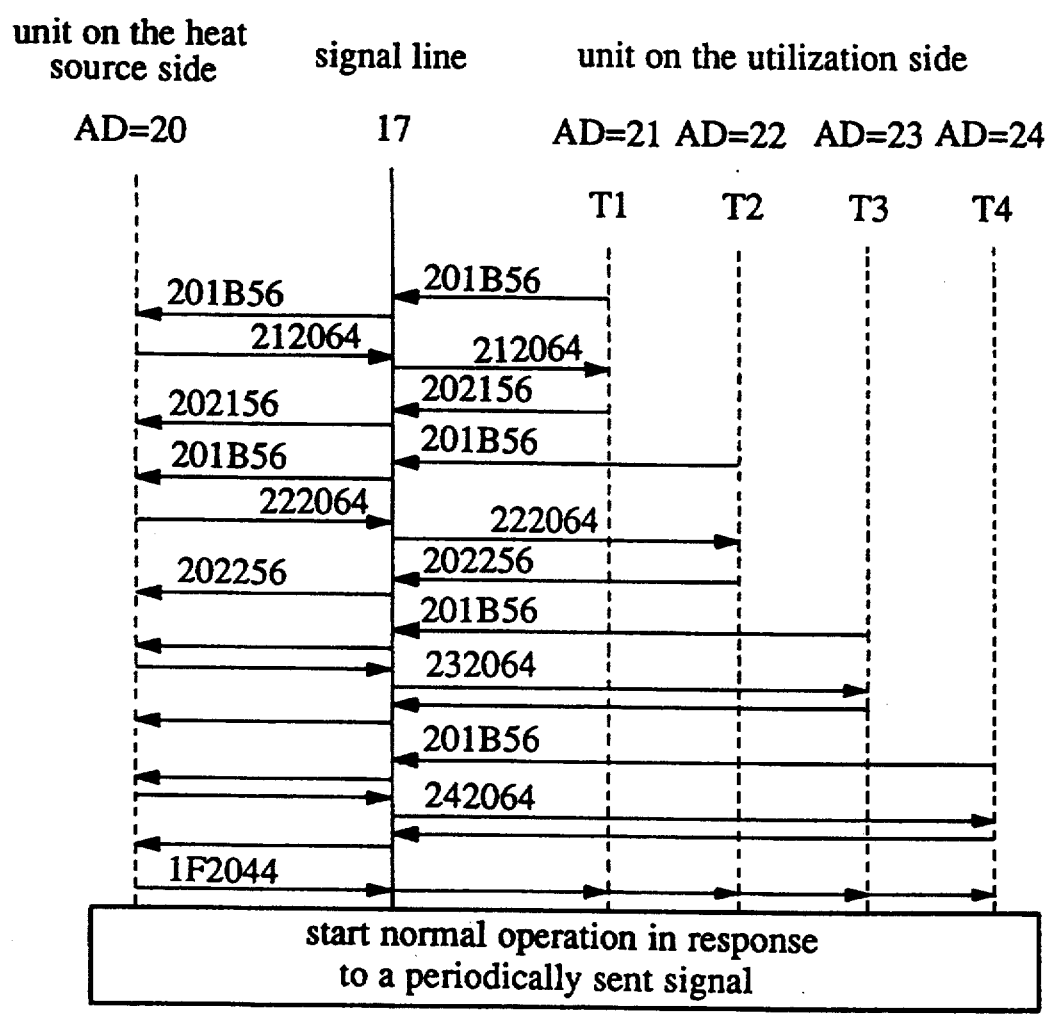
FIG. 9 is a time chart employable for automatically setting addresses for the unit on the utilization side with the apparatus of the present invention.

Addresses are sequentially set to other units on the utilization side involved in this group in the same manner as mentioned above, and addresses as shown in FIG. 1 are then automatically set. Consequently, when a process of automatically setting addresses to the units 5 to 8 on the utilization side by executing a series of control processings in accordance with the flowcharts shown in FIG. 7 and FIG. 8 is examined from the viewpoint of the signal arrival time order, a time chart shown in FIG. 9 is obtainable.

Next, the time chart shown in FIG. 9 will be described below.

Here, with respect to addresses to be assigned to the respective units, the address for the unit 2 on the heat source side is definitely determined to assume $AD=20$ and any one of addresses $AD=21$ to 24 is arbitrarily assigned to the addresses for the units 5 to 8 on the utilization side. Thus, it is not clear at the time of starting of the automatic address setting that each of the addresses $AD=21$ to 24 is set to which unit on the utilization side. However, as to a method of knowing the assigned addresses after the automatic address setting is completed, it is recommendable to employ a method of visually knowing the assigned addresses by displaying them on the screen of the remote controller 19.

First, when activation of the units on the heat source side and the units on the utilization side is confirmed, each unit on the utilization side in the Group corresponding to a single unit on the heat source side outputs a signal representing address setting to the signal line 17 after a randomly determined delay time T elapses. In the shown case, the delay time T is separately identified by delay times T1 to T4, and among the delay time T1 to T4, inequalities represented by $T1<T2<T3<T4$ are established.

After the delay time T1 elapses, the relevant unit on the utilization side outputs to the signal line 17 an address setting request signal having DATA of "201B56". At this time, since the unit 2 on the heat source side is ready to receive any signal, the address setting request signal can be received from the signal line 17. In response to the received signal, the unit 2 on the heat source side selects a certain address. At this time, since any address is not set to each unit on the utilization side, a smallest numeral of code "21" is selected as a set address. When the address is selected in this way, the unit 2 on the heat source side outputs to the signal line 17 an address setting signal having a destination address of $DA=DAA$.

After completion of the outputting of the signal "201B56", the relevant unit on the utilization side is held in the signal waiting state for a predetermined time S. When this unit on the utilization side receives a signal outputted to the signal line 17 therefrom while it is held in the signal receiving/waiting state, the received signal is registered with a destination address $DA=DAA$ as an address specific to this unit, and subsequently, this address is outputted to the signal line 17 as a signal having a source address SA assigned thereto, i.e., in the shown case, as a signal having a source address "202156" assigned thereto.

The unit 2 on the heat source side confirms that the address DA=ADD is selectively set as an address AD-=ADD for the unit 2 on the utilization side after the signal "202156" is received from the signal line 17, and thereafter, the unit 2 on the heat source side is brought in the signal receiving/waiting state so that it is ready to set a next address.

On the other hand, the unit on the utilization side having an address assigned thereto receives and monitors the communication executed by other unit, and then determines whether address overlapping occurs or not, depending on whether or not communication is executed with an address candidate for the relevant unit, i.e., with SA same to the temporary address for the relevant unit, i.e., with the signal "202156". In the case that it is determined that address overlapping occurs, the temporarily stored address is cleared, i.e., canceled, and thereafter, an address setting request is raised again to the unit 2 on the heat source side. The case that the address overlapping occurs is exemplified by the case that the signal outputted from a certain unit on the utilization side is not received by the unit 2 on the heat source side but control processing is executed by twice selecting and assigning a certain address.

Next, after a delay time T2 elapses, another unit on the utilization side, e.g., the unit 6 on the utilization side outputs an address setting request signal "201B56" to the signal line 17 and then executes address setting in the same manner as the case that the control processing is executed as described above. At this time, since an address "21" is already registered in the unit 2 on the heat source side as an address AD for the unit 6 on the utilization side, a subsequent address "22" is assigned to the unit on the utilization side having the signal "201B56" outputted therefrom as an address for the unit 6 on the utilization side.

Subsequently, addresses "23" and "24" are sequentially set to the units 7 and 8 on the utilization side in the same manner as mentioned above. When it is determined that the number of units each having an address automatically set thereto is coincident with the preset number, the address setting operation for all the units on the utilization side is completed. After a completion signal representing that the unit 2 on the heat source side has completed the automatic address setting is outputted to the signal line 17, control processing is executed by making a communication for assuring a normal operation of the apparatus.

It should be noted that each of the delay times T1 to T4 is set to a time interval for enabling the control processings for a series of automatic address settings to be satisfactorily completed, e.g., to about 20 milliseconds. For example, the foregoing time interval is determined in such a manner that T1 is set to 20 milliseconds, T2 is set to 40 milliseconds, T3 is set to 60 milliseconds and T4 is set to 80 milliseconds.

As is apparent from the above description, the control processings are sequentially executed for setting a plurality of addresses for the units on the utilization side for each group in such a manner that first, an address is set for each of the units on the heat source side and a recirculation cycle for the heat source fluid is then conducted for each unit on the heat source side by operating the compressor so as to identify a unit on the utilization side corresponding to the unit on the heat source side having the foregoing heat source fluid recirculation cycle conducted therefor to thereby set a certain address for the corresponding unit on the utilization side.

Incidentally, the location where each unit is installed should not be limited to a specific room in a certain building. It of course is obvious that the present invention may equally be applied also to the case that a plurality of groups as shown in FIG. 1 are built by a plurality of units installed at locations in each of buildings located adjacent to the first-mentioned building.

In addition to the embodiment of the present invention as mentioned above, the present invention may be carried out in accordance with several modified embodiments as noted below.

(1) In this modified embodiment, with the apparatus constructed as shown in FIG. 1, control conditions given by the remote controller 19 for the units 5 and 6 on the utilization side are set such that all the control conditions are equally applied to the units 5 and 6 on the utilization side, and moreover, all addresses to be assigned to the units 5 and 6 on the utilization side are set to AD=21.

(2) In this embodiment, with the apparatus constructed as shown in FIG. 1, the shown addresses are set to the units 1 to 3 on the heat source side by performing an adequate setting operation. At the time of starting of an automatic address setting operation, a single unit on the heat source side and all the units on the utilization side are fed with electricity so that they are held in the operative state. While the foregoing operative state is maintained, addresses to be assigned to the respective units on the utilization side involved in the group corresponding the unit on the heat source side are automatically set in accordance with the flowcharts shown in FIG. 7 and FIG. 8. On completion of the automatic address setting for the units on the utilization side, a subsequent unit on the heat source side is fed with electricity so that addresses to be assigned to the units on the utilization side are automatically set in the same manner as described in the preceding paragraph.

(3) In this modified embodiment, with the apparatus constructed as shown in FIG. 1, addresses are set to the units 4 to 16 on the utilization side without any occurrence of address overlapping by performing an adequate manual setting operation, and subsequently, it is confirmed by a first unit on the heat source side that a malfunction of address overlapping does not occur with the units on the utilization side. In the case that address overlapping occurs with some of the units on the utilization side, some addresses are selected from a plurality of preparative addresses to thereby correct them with the selected addresses, and thereafter, a heat source fluid recirculation cycle is conducted for each of the units on the heat source side. In response to a signal generated by detecting variation of the temperature in each of the units on the utilization side induced by the recirculation of the heat source fluid, addresses to be assigned only to the units on the utilization side belonging to the relevant group are memorized and registered in the memorizing section of the controller corresponding to the relevant unit on the heat source side.

(4) In this modified embodiment, with the apparatus constructed as shown in FIG. 1, instead of the detection of variation of the temperature in each unit on the utilization side caused by recirculation of the heat source fluid, a signal for confirming each unit on the utilization side corresponding to the relevant unit on the heat source side is generated by detecting a parameter causing variation of the physical properties due to variation of the temperature of the heat exchanger 35, e.g., variation of air flowing in the vicinity of the heat exchanger 35.

(5) In the contrast with the preceding modified embodiment of the present invention wherein each unit on the utilization side involved in the relevant group is confirmed by detecting the variation of the temperature in the foregoing unit on the utilization side by conducting the recirculation of the heat source fluid in the above-mentioned manner, in this modified embodiment, a plurality of pipings for flowing the heat source fluid therethrough are prepared by using pipe-shaped members each having excellent electrical conductivity so that each unit on the utilization side involved in the relevant group is confirmed by utilizing the electrical conductivity of each piping in order to make a communication at least at the time of automatic address setting. To practice this modified embodiment, each heat source fluid piping is generally constructed such that a copper pipe is surrounded by a sheath layer of foamed polyethylene resin and an adequate connecting/disconnecting member, e.g., a semiconductor switch is disposed at an electrical insulating location so as to allow selective connection of the copper pipe to a desired circuit to be made by selectively actuating the connecting/disconnecting member.

(6) In contrast with the aforementioned modified embodiment of the present invention wherein the delay time T is determined corresponding to the temperature of the heat exchanger 35 detected by the temperature detector 203, to practice this modified embodiment, a process of determining another random time is employed using, e.g., a certain hitherto known random number generator.

(7) In contrast with the aforementioned modified embodiment of the present invention wherein an occurrence of signal interference or collision is detected with the aid of the I/F circuits 50, 74 and 75 so as to make a normal communication, e.g., between the units on heat source side and the units on the utilization side, in this modified embodiment, hitherto known means employable for data intercommunication among a plurality of personal computers is used to constitute the apparatus of the present invention.

(8) In this modified embodiment, to confirm a unit(s) on the utilization side corresponding to each unit on the heat source side by utilizing the heat source fluid pipings, adequate means including one or more of the first to third characterizing features of the apparatus of the present invention as mentioned in the last part of the section "SUMMARY OF THE INVENTION" in this specification is selectively employed in addition to the various means as described in the several preceding paragraphs to constitute the apparatus of the present invention.

(9) In addition to the modified embodiments as mentioned above, in this modified embodiment, parts or components constituting the apparatus of the present invention are adequately deformed or modified without any departure from the scope of the present invention as defined by the appended claims by employing a hitherto known process of setting addresses for the units on the heat source side as well as the units on the utilization side.

What is claimed is:

1. A method of setting addresses for an apparatus including plural groups of air conditioners distributively arranged at remote locations wherein each group consists of a plurality of units on the heat source side and a plurality of units on the utilization side located remote from each other and connected to each other via a plurality of heat source fluid pipings extending therebetween and communication addresses are mutually set for said units on the heat source side and said units on the utilization side at the time of starting of a controlling operation to be performed between said units on the heat source side and said units on the utilization side, comprising:

a signal line forming procedure for forming communication signal lines for all the units including said units on the heat source side and said units on the utilization side involved in said plural groups with a single signal line;

a heat source fluid flowing procedure for flowing a heat source fluid through said heat source fluid pipings for each group;

a fluid flow detecting procedure for detecting physical variation attributable to the flowing of said heat source fluid in said units on the utilization side to thereby obtain a detection output; and an address setting procedure for setting said addresses based on said detection output.

2. An apparatus including plural group of air conditioners distributively arranged at remote locations wherein each group consists of a plurality of units on the heat source side and a plurality of units on the utilization side located remote from each other and connected to each other via a plurality of heat source fluid pipings extending therebetween, and communication addresses are mutually set for said units on the heat source side and said units on the utilization side at the time of starting of a controlling operation to be performed between said units on the heat source side and said units on the utilization side, comprising;

signal line forming means for forming communication signal lines for all the units including said units on the heat source side and said units on the utilization side involved in said plural groups with a single signal line;

heat source fluid flowing means for flowing a heat source fluid through said heat source fluid pipings for each group;

fluid flow detecting means for detecting physical variation attributable to the flowing of said heat source fluid in said units on the utilization side to thereby obtain a detection output; and address setting means for setting said addresses based on said detection output.

3. The apparatus according to claim 2, wherein said fluid flow detecting means is activated such that said detection of physical variation is achieved by detecting variation of a temperature in each of heat exchangers arranged in a certain unit on the utilization side.

4. The apparatus according to claim 2, wherein said apparatus is added with address setting means for said units on the utilization side for sequentially setting addresses each different from each other to said units on the utilization sides involved in said plural groups in response to delay signals each having a different delay time.

5. The apparatus according to claim 4, wherein said fluid flow detecting means is activated such that said detection of physical variation is achieved by detecting variation of a temperature in each of heat exchangers arranged in said unit on the utilization side; and said apparatus further includes delay time setting means for setting each of said delay times based on a detection value derived from detection of said temperature in said heat exchanger.

6. An apparatus including plural groups of air conditioners distributively arranged at remote locations wherein each group consists of a plurality of units on the heat source side and a plurality of units on the utilization side located remote from each other and connected to each other via a plurality of heat source fluid pipings extending therebetween at the time of starting of a controlling operation to be performed between said units on the heat source side and said units on the utilization side, comprising:

piping forming means for forming a plurality of pipings for a heat source fluid by using electrically conductive pipe-shaped members;

signal line forming means for forming communication lines for all the units including said units on the heat source side and said units on the utilization side involved in said plural groups with a single signal line;

set time communicating means for making communication at the time of setting of said addresses by utilizing electrical conductivity of said pipings; and control communicating means for making communication for the purpose of controlling with reference to said addresses by using said single communication line.

7. The apparatus according to claim 6, wherein said apparatus is added with address setting means for said units on the utilization side for sequentially setting said addresses each different from each other to said units on the utilization side involved in said plural groups in response to delay signals each having a different delay time.

* * * * *